Patented Apr. 13, 1937

2,076,817

UNITED STATES PATENT OFFICE 2,076,817

CELLULOSE PRODUCT

Adam Hoche, Brooklyn, N. Y., assignor to Cellulose Research, Inc., Chicago, Ill., a corporation of Illinois No Drawing. Application February 8, 1935,
Serial No. 5,585

4 Claims. (Cl. 260—10)

This invention relates to chemistry, particularly the chemistry of cellulose, and more especially to a process for forming a cellulose product and to the product itself.

A principal object of this invention is the production of a process suitable for producing a cellulose product which is of such a nature that it may be formed into a sheet which is water white and transparent and which is suitable for use as a transparent wrapping material comparable to the well known "Cellophane" of commerce.

A further object of the invention is the production of a process for producing a product of the nature described which is also especially suitable for coating absorbent articles made of cellulose in order to render them non-absorbent and resistant not only to the absorption of water but to the absorption of oil and grease.

A further object of the invention is the production of a process of the nature described for producing a product of the type specified which will have more mechanical strength than the ordinary well known "Cellophane" of commerce.

The particular method of carrying out the process is hereinafter described and the invention will be more particularly pointed out in the appended claims.

In order to make a cellulose product having the characteristics desired by applicant, it is necessary to first produce a cellulose fibre of the proper nature. This is to be done by a process devised by applicant.

In carrying out the process, applicant selects a suitable cellulose fibre carrying mass, such as wood chips, sisal, hemp, bagasse or the like, in fact any of the ordinary and well known source materials.

The selected material is placed in a vessel of suitable form, size and material and equipped with the obvious accessories for facilitating the treatment. In general, any vessel of the general form of a tank is suitable. The material is preferably placed somewhat loosely in the tank, to the end that the treating solution may readily penetrate to every particle.

Onto the material in the selected vessel, applicant flows or otherwise suitably distributes the treating solution so that the material is completely covered.

The treating solution consists of water and nitric acid mixed to a concentration of from 1° to 45° Baumé. The concentration is varied in accordance with the resistance to treatment of the material and the length of time found most suitable for the particular material, judged from the standpoint of resulting product.

In many cases, especially in the case of bagasse, saccharoses will be present in sufficient quantity to cause the reaction to proceed and at a proper rate. In many cases, however, in order not only to accelerate the reaction but to produce proper reaction, ordinary cane sugar or molasses is added. This sugar or molasses may be added to the original water solution of nitric acid or evenly distributed throughout the mass of material to be treated or even roughly thrown into the mass, either before or after adding the diluted nitric acid. I add, usually, about 5 pounds of cane sugar, or the equivalent of molasses, to each ton of wood chips, but this may be decreased to about one pound in some cases and in others increased to 8 pounds depending upon the quantity of substances in the fibre mass, capable of reacting to form oxalic acid, or the rapidity with which I desire the reaction to proceed.

The reaction is started at ordinary room temperature, but the mass heats up as the reaction progresses. No pressure is used, and no agitation of the mass.

After about 40 minutes in the case of ordinary materials, using 40°–45° Baumé acid, the reaction is practically completed, but it is usual and advantageous to allow the reacted mass to stand for about two hours to certainly insure the complete digestion of all pits.

The time given is about right for the ordinary case but the criterion is to continue the reaction until the brown fumes which first arise cease to come off. This is very important as the product does not have the desired characteristics for the further treatment unless the reaction is caused to proceed thus far.

After the required time, the free liquid in the tank is drained off, and the wet mass is then subjected to any suitable process whereby the absorbed and otherwise associated dilute acid solution is separated from the fibre. Applicant prefers to place the whole mass in a centrifuge and throw out the undesired dilute acid solution and other dissolved impurities and admixed substances.

After all possible liquids are separated, the mass is then washed with water in any suitable or appropriate manner until suitable tests show the material free from the undesired substances. When a centrifuge is used to separate the fibre mass from liquids the washing may take place in the centrifuge. In any event the washing is continued until by proper and appropriate tests it is found that the washing has proceeded to the desired extent, as by washing till acid free.

The yield obtained by the described process is much higher than obtained by the usual processes. A yield of 15% to 20% higher than by usual processes seems to be usual.

The process is also suitable for treating many forms of materials which are unsuitable for the ordinary processes. It seems to have a power of disintegration not exhibited by usual processes.

The product resulting from the hereinbefore described process is usually of sufficient whiteness to obviate the necessity of a bleach, however, if a bleach is necessary it may be applied in the ordinary and well known manner.

The product is especially suitable for the production of cellulose esters. The reason for the superior quality is not thoroughly understood but it is believed to be due to the large percentage of oxy-cellulose present.

The gist of the process consists in using dilute acid solution, such as nitric acid, with a substance such as a saccharose or starch or lignin which will by reaction generate oxalic acid, in situ, in a bath which is free from other chemicals which attack the mass so strongly as to injure the fibre.

The cellulose or oxy-cellulose obtained by carrying out the above described process may be used for the next step while wet, that is, the product of the hereinbefore described process may well be a cellulose pulp containing, roughly 80% of water and 20% of cellulose fibre. This wet pulp may even be slightly acid without detriment to the further steps, except that it will require the expenditure of some alkali to neutralize the acid present.

The wet pulp is placed in any suitable or appropriate vessel of a nature such that it will resist action of the chemicals used and will then be treated with an alkali, preferably caustic soda or sodium hydroxide. The quantity of caustic soda used will be from about 1 to 2% by weight of the wet pulp. The caustic soda is preferably used in water solution of a concentration of about 30° Baumé. When the wet pulp is treated with such caustic soda solution it may be stirred to facilitate the reaction or it may be allowed to stand and the reaction will take place more slowly.

The action of the caustic soda upon the wet pulp is to form a rather viscous slimy apparently colloidal mass. This mass, however, is sufficiently fluid to be squirted through a fine orifice or to be coated on an object either by dipping, spraying, or brushing.

The product formed by the reaction between the washed pulp and the caustic soda is coagulated or hardened by treatment with very dilute solution of sulphuric acid. A 1% water solution of concentrated sulphuric acid is about right. The treatment with dilute sulphuric acid should be made on the product after it has been, what might be called, mechanically attenuated, that is, formed into small threads or thin films. If the material squirted from an orifice is received in a vessel containing such dilute sulphuric acid it will harden and form threads or ribbons. If a coating made from the product is to be hardened, the object coated is either dipped or washed, as by a gentle spray with dilute sulphuric acid solution. If a sheet of the material is desired it is first squirted from a slit and immediately or soon thereafter, in accordance with the nature of the machinery used passed through a bath of the dilute sulphuric acid. As such sheets are often made by squirting a thin sheet of such material upon a drum, this product may be likewise made. In such case after the material had been spread upon the surface of the drum it should be passed through a shower or bath of dilute sulphuric acid.

After the product has been treated with dilute sulphuric acid, it is then allowed to dry, whereupon it becomes hard and strong. It is water white and non-absorptive of water, oil, and grease. As compared to the ordinary "Cellophane" of commerce it is very much stronger. An ordinary "Cellophane" sheet on a Mullins tester would indicate from 16 to 20 whereas a comparable sheet of this product would indicate about 100. When it is severed it seems to be more of a tear than the customary apparent break of "Cellophane".

Although caustic soda is the preferable alkali it is to be understood that ammonium hydroxide may equally well be used. In case it is used, it should be used of a concentration in water of from 22 to 26 degrees Baumé and in amount comparable chemically with that of the caustic soda.

Applicant is unable to explain the exact chemical nature of the reaction which occurred in the various steps of the process. As hereinbefore stated, it is believed that the first step of the process produces a cellulose which may be called an oxy-cellulose in that oxygen has been added thereto. It is to be noted, however, that it is only when the reaction in the first part of the process is carried so far that substantially no brown fumes arise from the mass that a proper product is obtained by the first part of the process to use in the second part, in short, it appears as though the proper oxy-cellulose is not formed unless the reaction is carried thus far. Applicant prefers to call the final product an oxy-cellulose ester, but it may well be that his final product is a cellulose hydrate, or even a pure cellulose.

Having described the principle of my invention and one mode of operation thereof, and the product resulting from the process as described, I desire to have it understood that the description is merely illustrative and does not exhaust the possible modes of exhibiting the underlying principle.

What I claim as new and desire to secure by Letters Patent of the United States, is:

1. A process of forming a cellulose product which consists in treating a cellulose fibre containing mass with dilute nitric acid and until brown fumes at first produced cease to come off, separating the liquids from the solids, washing with water, treating with one to two percent by weight of an alkaline hydroxide in water solution, then after mechanically attenuating the resulting product treating with a dilute solution of sulphuric acid and drying, whereby a water white transparent solid material, non-absorptive of water, oil, and grease results.

2. A process of forming a cellulose product which consists in treating a cellulose fibre containing mass with a substance selected from the group consisting of a saccharose and starch and with dilute nitric acid and until brown fumes at first produced cease to come off, separating the liquids from the solids, washing with water, treating with one or two percent by weight of caustic soda in water solution of a concentration of about thirty degrees Baumé, then after mechanically attenuating the resultant product treating with a dilute solution of sulphuric acid and drying, whereby a water white transparent solid material, non-absorptive of water, oil, and grease results.

3. A process of forming a cellulose product which consists in treating a cellulose fibre containing mass for about forty minutes to two hours until brown fumes at first produced cease to come off, at room temperature and ordinary atmospheric pressure with absence of agitation with about one to eight pounds of a substance selected from the group consisting of a saccharose and starch to two thousand pounds of said mass and dilute nitric acid of about forty degrees to forty five degrees Baumé sufficient to cover the mass and then separating the solids from the liquids, washing with water until substantially acid free, treating with one to two percent by weight of caustic soda of a solution of a concentration of about thirty degrees Baumé, then after mechanically attenuating the resultant product treating with a dilute solution of sulphuric acid and drying whereby a water white transparent solid material, non-absorptive of water, oil and grease results.

4. A process of forming a cellulose product which consists in treating a cellulose fibre containing mass at room temperature and ordinary atmospheric pressure with absence of agitation with about one to eight pounds of cane sugar to two thousand pounds of said mass and dilute nitric acid of about forty to forty five degrees Baumé sufficient to well cover the mass until brown fumes no longer arise and then separating the solids from the liquids and washing with water, treating with one to two percent by weight of caustic soda in water solution of a concentration of about thirty degrees Baumé, then after mechanically attenuating the resultant product treating with a dilute solution of sulphuric acid and drying whereby a water white transparent solid material non-absorptive of water, oil and grease results.

ADAM HOCHE.